Aug. 1, 1967 G. H. GIBB 3,333,475
SHOCKPROOF MECHANICAL OVERSPEED GOVERNOR
Filed Jan. 28, 1965 2 Sheets-Sheet 1
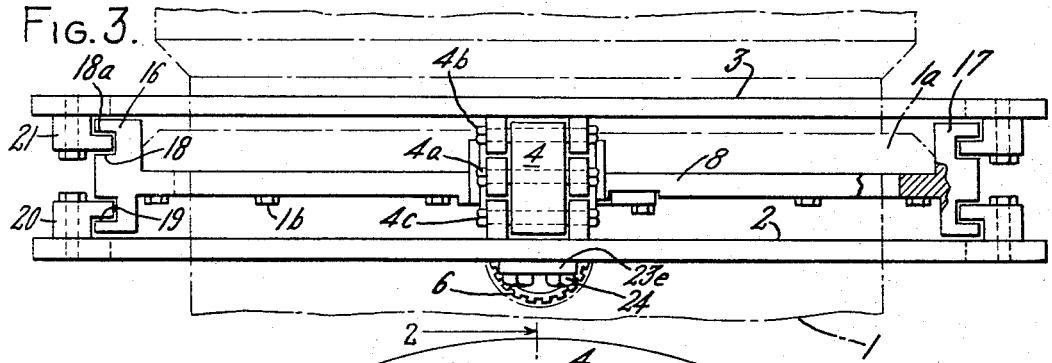
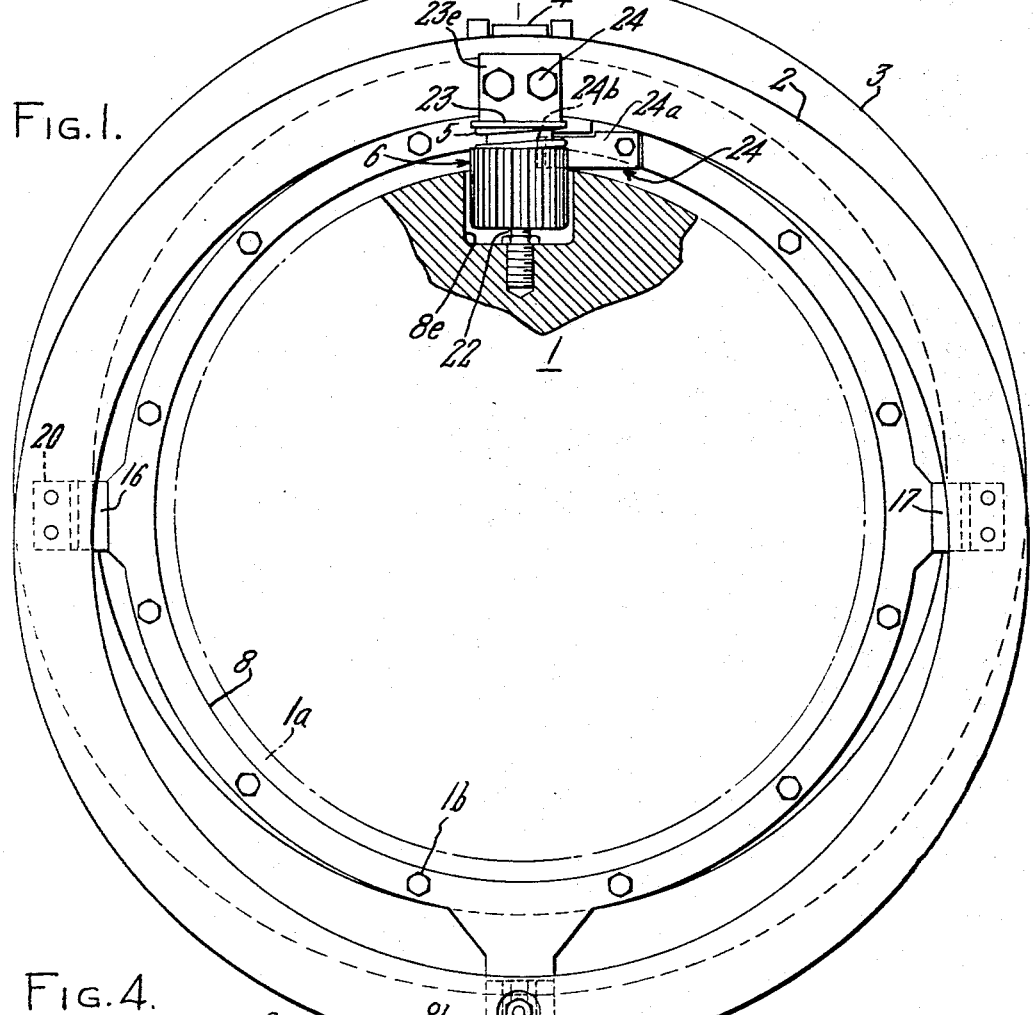
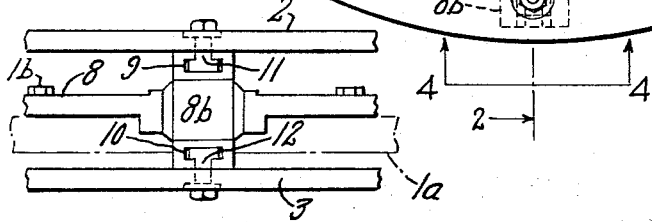
INVENTOR
GEORGE H. GIBB
BY W. C. Crutcher
HIS ATTORNEY

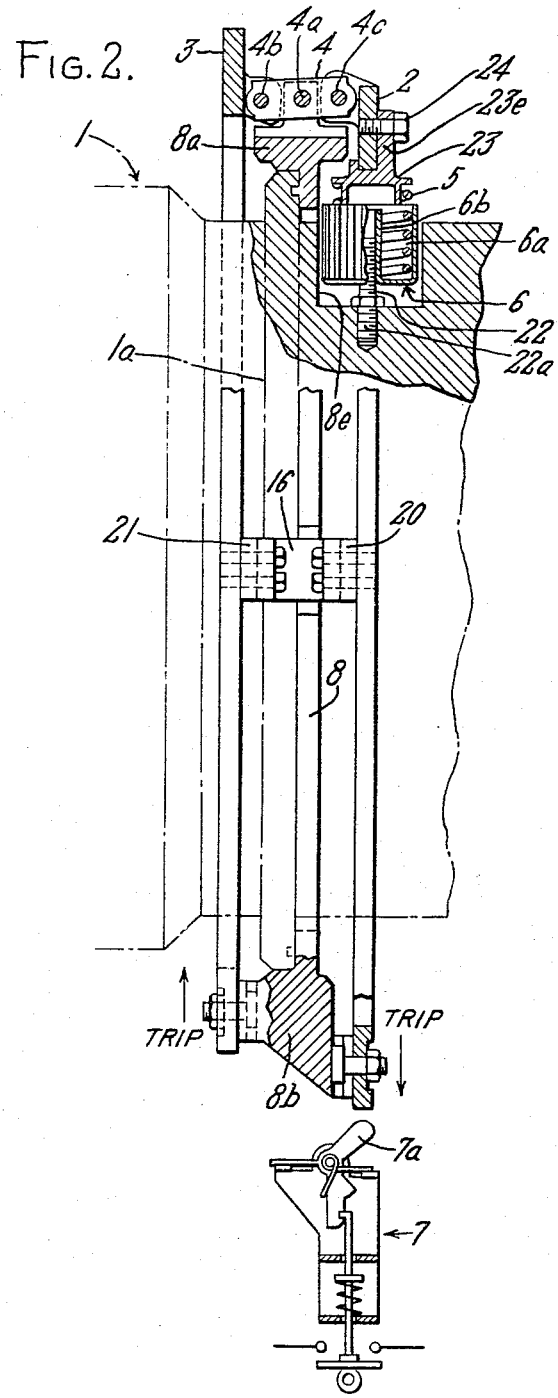

United States Patent Office 3,333,475
Patented Aug. 1, 1967

3,333,475
SHOCKPROOF MECHANICAL OVERSPEED GOVERNOR
George H. Gibb, Swampscott, Mass., assignor to General Electric Company, a corporation of New York
Filed Jan. 28, 1965, Ser. No. 428,631
3 Claims. (Cl. 73—535)

ABSTRACT OF THE DISCLOSURE

Mechanical overspeed governor has a pair of symmetrically similar eccentrically disposed rings surrounding shaft which move against spring bias toward a more eccentric position to trip overspeed actuator.

This invention relates to mechanical speed governors, particularly to a simple shockproof mechanical overspeed governor, as used for instance in shutting down a prime mover powerplant such as an elastic fluid turbine, in the event the speed rises to a preselected value.

In the past, steam turbines have customarily employed very simple and reliable mechanical overspeed governors to shut the powerplant down in the event rotor speed rises to a dangerous value. For certain applications, it is extremely important that the governor be as shockproof as possible in order to prevent malfunctions at speeds lower than the pre-set tripping speed. The primary purpose of the present invention is to provide an improved shockproof governor, which is little or no more complicated than those used heretofore, yet is completely resistant to shock forces irrespective of the direction from which the shock load is applied, and is equally insensitive to complex acceleration harmonics which may be present in sudden shock waves.

Specifically, the purpose of the invention is to provide a shock-resistant mechanical governor, which is effective at shocks in the order of 125 G's, the shockproof qualities being insensitive to the direction of application of the shockwave forces.

A further object is to provide a centrifugal overspeed governor having geometric symmetry, which is readily applicable to a large diameter shaft, which requires no holes of significant size in the shaft (thus leaving the shaft available for oil passages and other holes), which provides positive actuation even at very low speeds, and which employs large masses with a force multiplication arrangement, and without any dynamic unbalance, either in the tripped or untripped condition.

Another object is to provide a simple mechanical overspeed governor requiring no electrical or electronic gadgetry, so that it is independent of electrical power failures which might occur as a result of severe shock to the equipment.

Another object is to provide a mechanical overspeed governor, all parts of which are external to the shaft so as to be readily available for inspection and servicing, substantially without disassembly of either the governor mechanism or turbine casing.

Other objects and advantages will become apparent from the following description, taken in connection with the accompanying drawings, in which:

FIG. 1 is a cross section of a steam turbine shaft having a mechanical overspeed governor in accordance with the invention, FIG. 2 is a longitudinal section taken on the plane 2—2 in FIG. 1, FIG. 3 is a top view of the governor taken on the plane 3—3 in FIG. 1, and FIG. 4 is a detail view, partly in section, of the mechanical guides providing for free sliding movement of the eccentric masses which effect actuation of the governor, as seen from 4—4.

Briefly stated, the invention is practiced by providing two substantially identical ring-members surrounding and radially spaced from the shaft of the prime mover, the rings being offset, in opposite directions, very slightly from the axis of rotation of the shaft. The ring members are coupled together by one or more lever members so that the centrifugal forces acting on one ring are added to the forces on the other ring to provide a force-multiplying effect producing positive actuation of the governor. A suitable spring member biases the rings back towards their normal operating position, with adjusting means for varying the spring force to pre-select the tripping speed.

Referring specifically to FIG. 1, the invention is shown as applied to a shaft portion 1 of a prime mover which may be turning at a relatively slow speed as, for instance, 300 r.p.m. Surrounding the shaft portion 1 are two substantially identical ring members 2, 3 spaced axially a slight distance, as better seen in FIG. 2, and coupled together by a lever member 4 carried on a pivot 4a which is supported on the shaft by means to be described more specifically later, the lever member 4 having opposite end portions pivoted at 4b, 4c respectively to the two rings 3 and 2. These two rings are displaced by a small distance in opposite directions from the axis of rotation of the shaft 1, so centrifugal force tends to cause them to move still farther in opposite radial directions away from the axis, such motion being resisted by a graduated spring member 5 with suitable means 6 for adjusting the compression of the spring so as to select the speed at which the governor will act. When the "tripping speed" is reached, the rings fly out in opposite directions parallel to a common shaft diameter and at least one of them strikes the finger 7a of a conventional trip device shown generally at 7. This trip device may of course be arranged to actuate various indicating, alarm or governing devices, the precise nature of which need not be discussed here since the present invention lies in the mechanical details of the overspeed governor.

Referring now more particularly to FIG. 1, the two rings 2, 3 are arranged to slide radially in opposite directions on the shaft 1, being disposed for such sliding motion by a number of guide members to be described later in detail. In actual practice, the rings 2, 3 are built up from a number of arcuate segments disposed in overlapping arrangement and secured by a circumferential row of threaded fastenings (not shown). This segmented construction for the rings makes it readily possible to assemble them around a very large diameter shaft 1, and to remove them for servicing or replacement. Here, however, they are simply shown as solid rings in order not to obscure the invention.

The lever member 4 and the guide means for supporting the rings 2, 3 in sliding relationship are supported on a common radially projecting support ring member 8 which is attached coaxially with shaft 1 on shaft flange 1a by means of fasteners 1b.

This support ring 8 projecting from the shaft 1 is provided with diametrically opposite boss portions 8a, 8b. Boss portion 8a provides the fulcrum for the pivot 4a of lever 4, and, at a diametrically opposite location, the boss portion 8b forms the guides for transverse sliding motion of the respective rings 2, 3. As indicated above, construction of these guides will be seen better from a comparison of FIGS. 2, 3, 4. Specifically, FIG. 2 shows a longitudinal sectional view of the boss 8b, and FIG. 4 shows a bottom view of boss 8b.

It will be seen that boss 8b defines a pair of radially extending grooves of T-shaped cross section identified 9, 10 in FIG. 4. The respective rings 2, 3 each has an axially projecting T-member 11, 12 respectively sliding in the grooves 9, 10 so as to guide the direction of motion of the rings.

The pivoted lever member 4 performs a guiding function similar to the T-head guide members at the other end of the common shaft diameter remote from the boss 8b. Specifically, in FIG. 2 it will be seen that the lever 4 is carried on the pivot 4a, while the pivots 4b, 4c are carried in bosses projecting axially from the rings 3, 2 respectively. It will be apparent that the T-head guide arrangements associated with the boss 8b cooperate with the pivoted lever 4 on boss 8a to cause the rings 2, 3 to slide in opposite radial directions when centrifugal force acting on the rings overcomes the biasing spring 5.

To further guide the transverse sliding movement of rings 2, 3, the support ring 8 is provided with an additional pair of diametrically spaced guides 16, 17 which are shown as an integral part of support ring 8 for simplicity. Each guide 16, 17 defines tangentially extending guide passages or grooves, the cross section of which may be seen in FIG. 3. Specifically, guide 16 defines two tangentially extending rectangular grooves 18, 19. Cooperating with these grooves are lug members 20, 21 attached to rings 2, 3 respectively and having projecting portions sliding in the grooves. Grooves 18, 19 may be lined with a suitable low-friction material such as Teflon.

The opposite guide 17 is likewise provided with rectangular grooves and engaged by appropriate lugs secured to the accompanying ring member. Thus it will be seen that rings 2, 3 are guided at four places each, for sliding motion parallel to a common shaft diameter and in opposite directions as dictated by the eccentricity of the rings and the interconnection provided by the lever member 4.

The biasing and adjusting means for determining the tripping speed of the governor is as follows:

The biasing coil spring 5 is disposed in a cylindrical member 6 defining an annular chamber 6a and having a central cylindrical portion 6b provided with a threaded bore engaging the external thread of member 22. This member 22 has a lower end portion 22a threaded into the shaft, at the bottom of a radially disposed cylindrical recess 8e. Threaded fitting 22 has an outwardly projecting portion 22b with an exterior thread carrying the cylindrical bore portion 6b of the adjusting cylinder 6.

The outer end of spring 5 engages a cylindrical fitting 23 having a radially projecting ear 23a secured by machine screws to the ring 2. It will be obvious that for 100% symmetry the other ring 3 might be provided with a similar diametrically-opposite spring-biased adjusting device, but only one such device is shown. It will also be apparent that spring 5 biases ring 2 upwardly in FIG. 2, simultaneously biasing the ring 3 downwardly because of lever 4. The direction of biasing is such as to tend to make the rings to move toward a position coaxial with the rotor although they of course cannot reach this position because lever 4 has much too short a stroke. Adjustment of spring force is accomplished by rotation of the cylindrical fitting 6 which causes it to move radially on the thread 22b so as to vary the compression force exerted by the spring 5 on the fitting 23. Thus appropriate rotation of the fitting 6 varies the tripping speed of the governor.

To prevent accidental rotation of the cylindrical adjusting fitting 6, a spring locking device is provided, as shown in FIG. 1 at 24. This comprises a leaf spring 24a secured by screw 25 to a side portion of the flange member 8. The opposite end of leaf spring 24a is bent over as shown at 24b in FIG. 1, having a knife edge portion adapted to engage the serrations or knurling provided on the exterior surface of the cylindrical fitting 6. Thus it will be apparent that the engagement of the spring finger with these serrations prevents accidental rotation of the adjusting member 6.

The operation of this simple governor will be apparent from the above description of the structure. The adjusting member 6 is set so that at normal speeds the compression force of spring 5 overcomes or balances centrifugal force acting on the two rings 2, 3 and holds the rings in the position shown, with their centers on opposite sides of the shaft centerline or axis of rotation. Because of the connecting lever 4, centrifugal force acting on ring 2 is added to the centrifugal force acting on ring 3 to oppose the compression of spring 5. Thus the mechanism provides a "force multiplication arrangement" for insuring positive actuation of the device. When the tripping speed is reached, the rings 2, 3 slide rapidly in opposite directions in their guiding grooves described above and in the direction shown by the arrows in FIG. 2, until the ring strikes the trip finger 7a of the tripping device 7.

The use of two large diameter ring-members such as the centrifugal weights of this governor make it unnecessary to provide holes in the shaft portion 8 (except for the very small peripheral portion occupied by the recess 8e), so that the bulk of the shaft cross section is available for oil passages or other openings. The absence of holes in the shaft also of course means that the shaft may be of smaller diameter for a given strength required. The use of ring-shaped weights also makes it readily possible to provide weights of any desired mass required to effect positive actuation with ultimate reliability, even when the shaft speed at which the governor is to trip is only on the order of a few hundred r.p.m. The use of the interconnecting lever 4 provides a force multiplying effect which also contributes to the positive actuation and the high degree of reliability of the governor.

It is important to note that the eccentric ring masses of this governor are substantially "symmetrically similar," and it is the symmetry of these critical governor parts which accounts for the fact that it is insensitive to shock forces, including complex acceleration harmonic forces, irrespective of the direction from which these forces may be applied to the governor parts as a result of extreme shocks experienced during battle. It has been found that simply balancing the the weights of one eccentric mass against another is not good enough to provide such 100 percent insensitivity to shock. It is also necessary to provide substantial radial geometric similarity to combat the effect of harmonics of the shock waves.

This improved governor may be readily applied to any diameter shaft, no matter how big, and the critical parts of the governor are all carried exteriorly of the shaft so as to be readily available for inspection and servicing.

It is also important to note that with governor parts of the type described, there is substantially no dynamic unbalance of the rotor, either when the weights are in their "tripped" or in their "untripped" condition. It is likewise important that the governor is independent of any electrical current supply, utilizing simple mechanical devices.

Thus the invention provides a mechanical governor having good reliability required in a powerplant subject to severe shock forces. For instance, on a shock test machine, the governor was subjected to shock forces of 150 G's without causing accidental tripping of the device.

While only one specific form of the invention has been described here, it will be apparent that many modifications and substitutions of equivalents may be made, and it is of course intended to cover by the appended claims all such changes as fall within the true spirit and scope of the invention.

What is claimed as new and is desired to be secured by Letters Patent of the United States is:

1. In a mechanical speed governor for a machine having a rotating shaft, the combination of:
   a fulcrum support constructed to be carried on a peripheral portion of the shaft and having lever means thereon oriented to be movable in a radial direction,
   a pair of substantially identical and symmetrical ring members surrounding and spaced axially on the shaft on either side of said fulcrum, and each having portions actuated by the lever means so that the rings move in opposite radial directions, said rings being spaced with their centers radially equidistant from the shaft and disposed eccentrically on opposite diametral sides of the shaft axis, means biasing said rings in a direction to make them tend to move against centrifugal force toward a position coaxial with the shaft axis, and tripping mechanism actuated by at least one of said rings as it moves from a less eccentric to a more eccentric position against the biasing means when the shaft exceeds a predetermined rotational speed.

2. In a mechanical speed governor for a machine having a rotating shaft, the combination of:

a first shaft portion with a substantially cylindrical circumferential surface, a pair of substantially identical and symmetrical ring members spaced axially from each other and surrounding and spaced radially from said first shaft portion, guide means carried on the shaft portion and constraining said ring members to move in opposite radial directions upon occurrence of a preselected speed condition, lever means having opposite end portions actuated by said respective ring members whereby centrifugal force on one ring member is communicated to the other ring member, fulcrum means carried on said first shaft portion between said ring members and engaging an intermediate portion of said lever means, and spring means biasing said ring members in opposite directions parallel to a common diameter of the first shaft portion, the normal operating position of the ring members being with their geometric centers spaced radially at opposite sides of and equidistant from the axis of rotation of the first shaft portion, whereby occurrence of a preselected rotational speed condition of the shaft causes said ring members to move radially in opposite directions on said guide means against the bias of said spring means to effect actuation of a speed signal device.

3. Mechanical speed governor in accordance with claim 2 and including means for preselecting the tripping speed of the governor, comprising:

a radially disposed cylindrical cup member having a serrated external surface and a threaded portion, and disposed in a recess defined in a peripheral portion of the first shaft portion, a radially extending threaded member engaged with the threaded portion of the cup, whereby rotation moves the cup radially in said shaft recess, detent means engaging the external serrations of the cup to prevent accidental rotation thereof, said cup being constructed and arranged to hold said spring biasing means and thereby adjust the tension thereon when the cup is rotated.

References Cited

UNITED STATES PATENTS

| | | | |
|---|---|---|---|
| 725,591 | 4/1903 | Rossiter | 73—510 XR |
| 1,666,490 | 4/1928 | Dryer | 73—548 XR |
| 2,254,520 | 9/1941 | Garrott | 73—548 XR |
| 3,165,935 | 1/1965 | Gardner | 73—548 |

FOREIGN PATENTS 682,645  11/1952  England.

JAMES J. GILL, *Acting Primary Examiner.*